C. FINGLER & N. O. STURTEVANT.
LINK MESH MACHINE.
APPLICATION FILED JULY 6, 1914.

1,290,951.

Patented Jan. 14, 1919.
5 SHEETS—SHEET 1.

Witnesses
W. H. Bardsley
A. F. Macready.

Inventor
Carl Fingler
Norris O. Sturtevant

By
Howard E. Barlow
Attorney

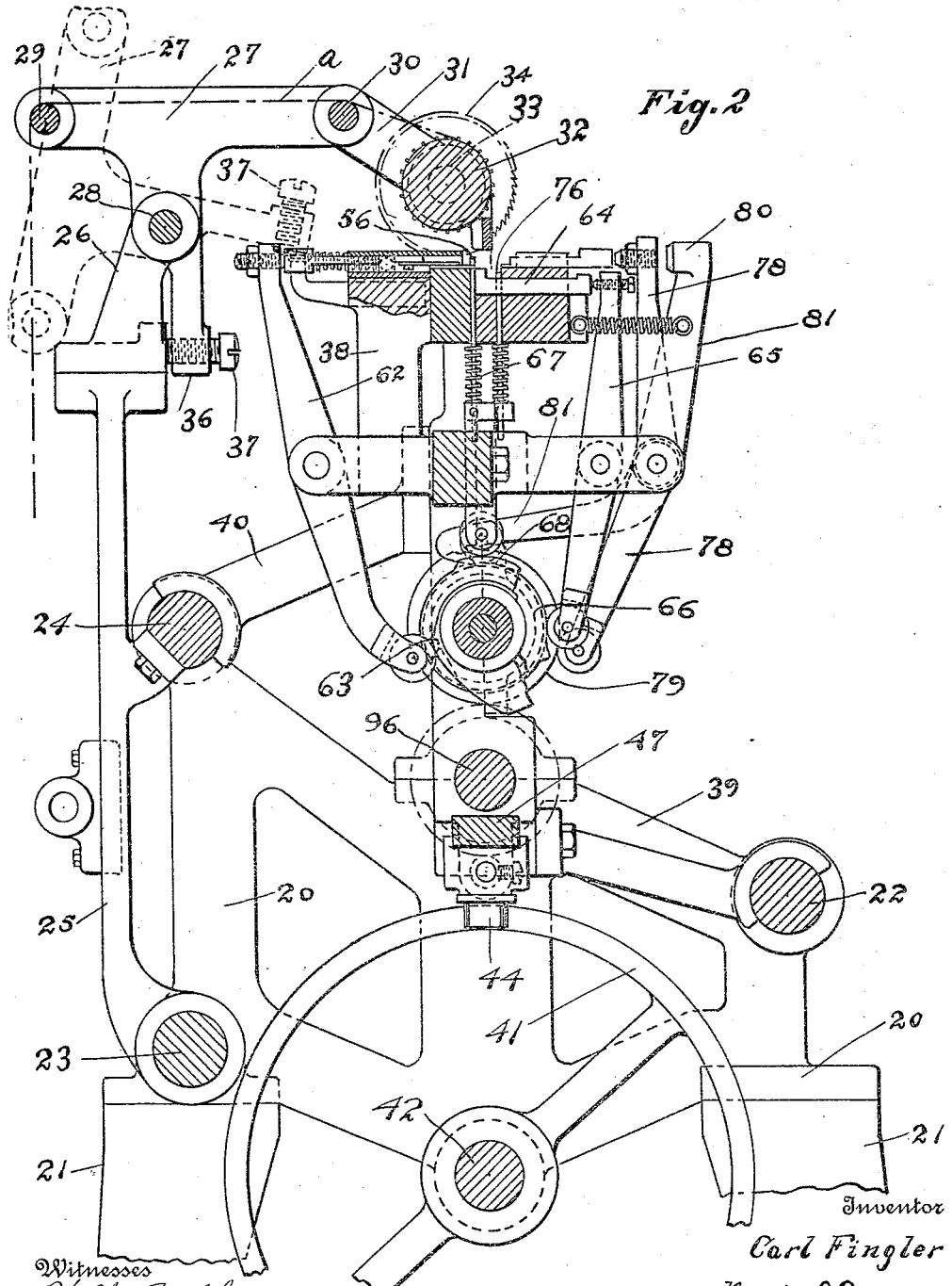

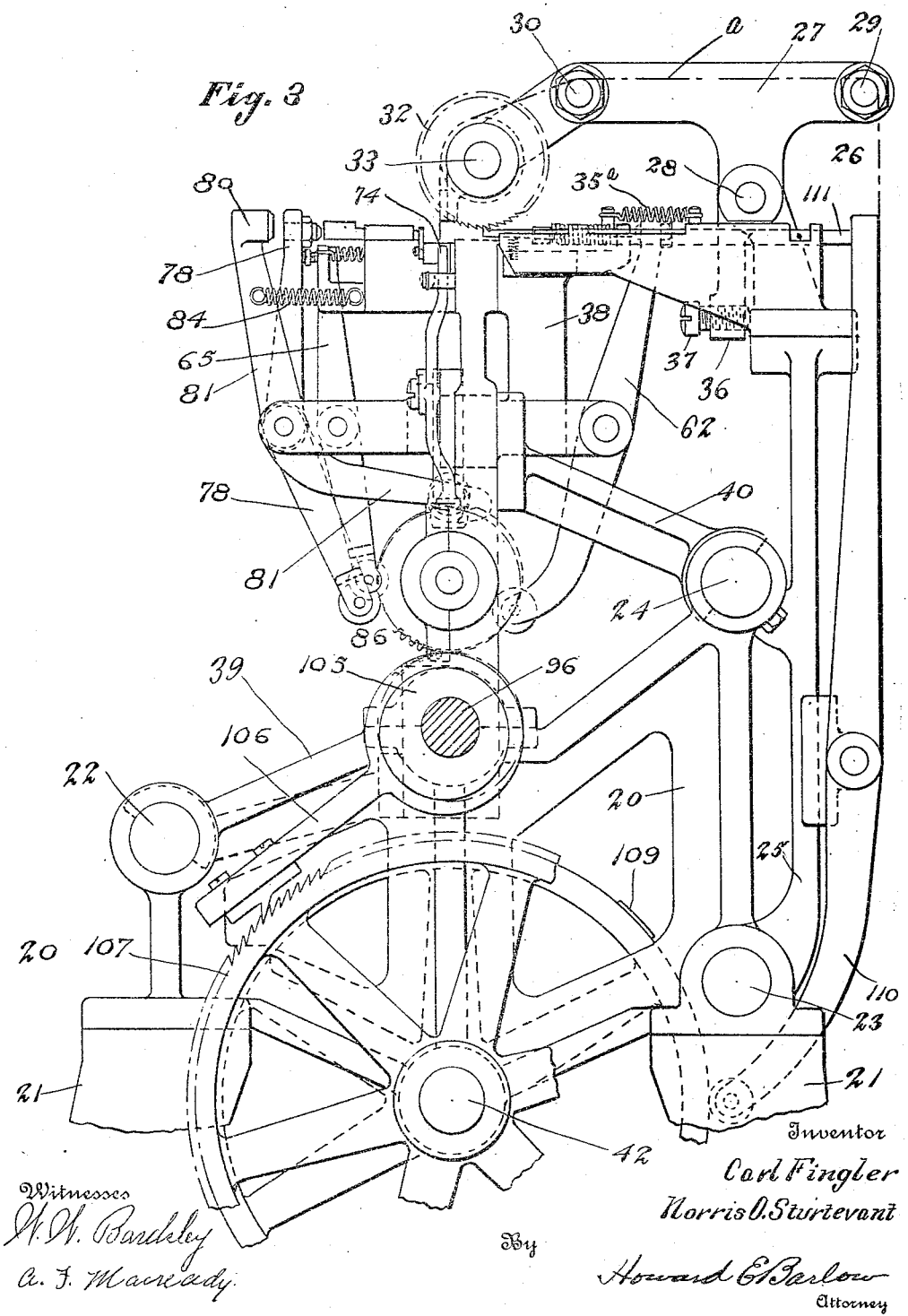

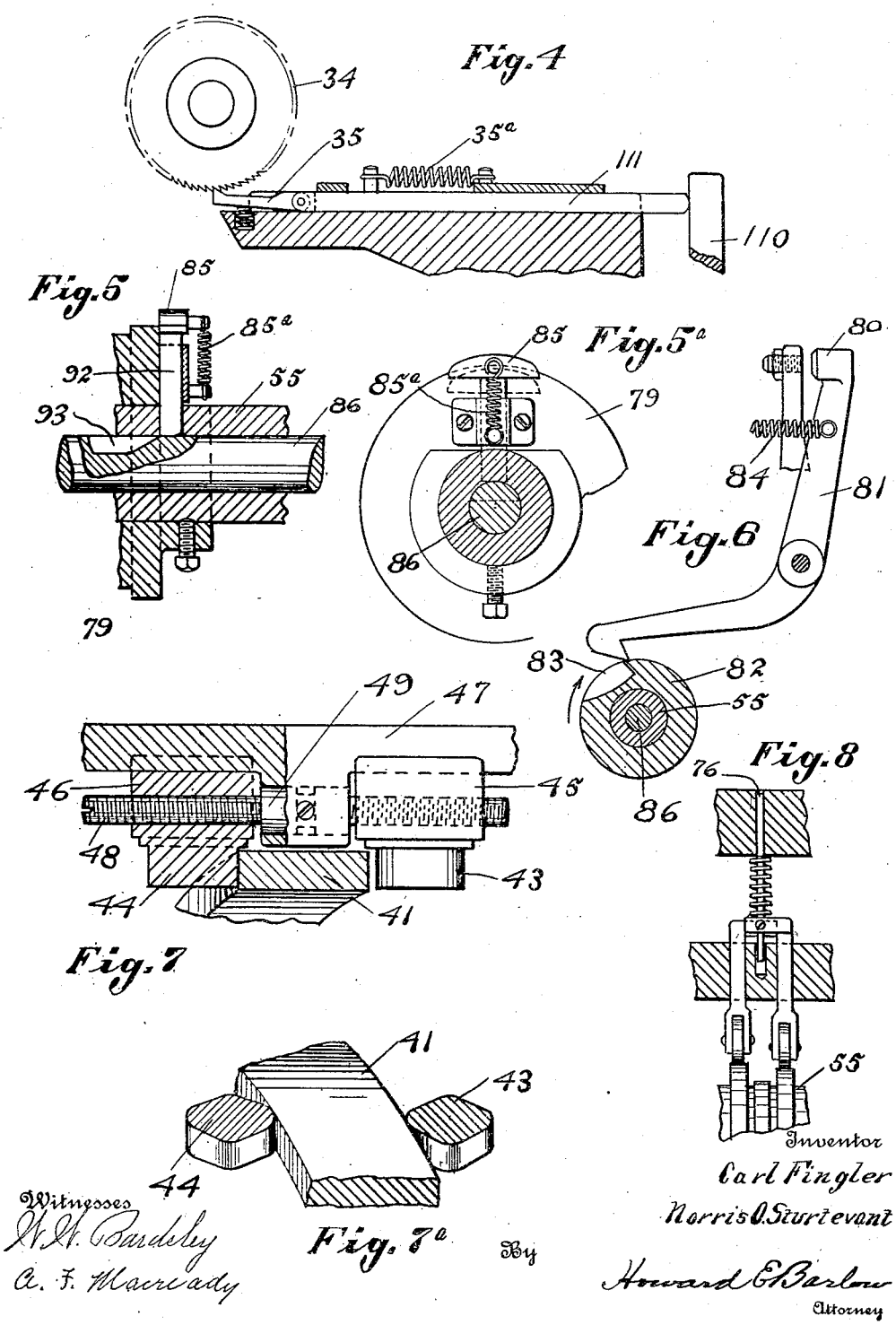

C. FINGLER & N. O. STURTEVANT.
LINK MESH MACHINE.
APPLICATION FILED JULY 6, 1914.
1,290,951.
Patented Jan. 14, 1919.
5 SHEETS—SHEET 5.
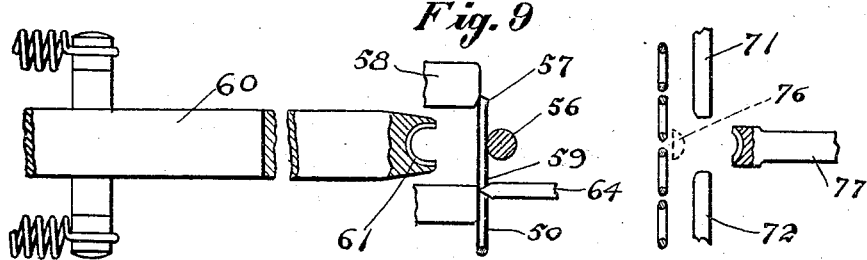
*Fig. 9*
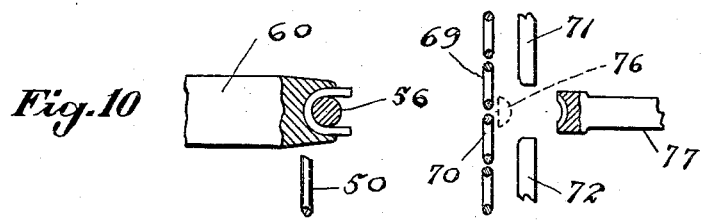
*Fig. 10*
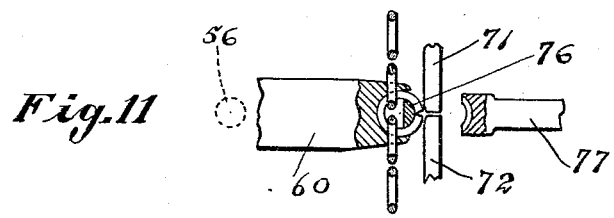
*Fig. 11*
*Fig. 12*
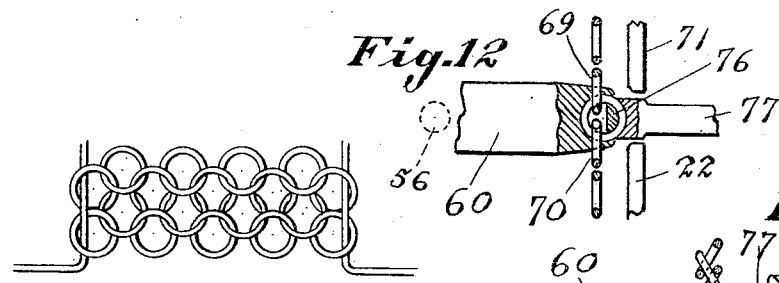
*Fig. 14*
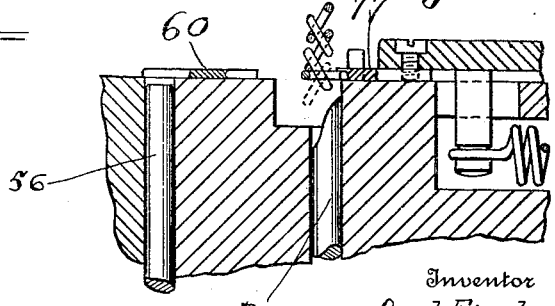
*Fig. 13*
Witnesses
W. W. Bardsley
A. F. Macready.
Inventor
Carl Fingler
Norris O. Sturtevant
By
Howard E. Barlow
Attorney

UNITED STATES PATENT OFFICE.

CARL FINGLER AND NORRIS O. STURTEVANT, OF PROVIDENCE, RHODE ISLAND, ASSIGNORS TO N. BARSTOW COMPANY, OF PROVIDENCE, RHODE ISLAND, A CORPORATION OF RHODE ISLAND.

LINK-MESH MACHINE.

1,290,951.     Specification of Letters Patent.     Patented Jan. 14, 1919.

Application filed July 6, 1914.   Serial No. 849,081.

*To all whom it may concern:*

Be it known that we, CARL FINGLER and NORRIS OSBON STURTEVANT, citizens of the United States, and residents of the city of Providence, in the county of Providence and State of Rhode Island, have invented certain new and useful Improvements in Link-Mesh Machines, of which the following is a specification.

This invention relates to machines for automatically making wire fabric of the type known as ring mesh, which consists of a multiplicity of intermeshing links.

One of the objects of this invention is to provide a link-mesh forming machine which will make the fabric in flat or sheet form having its transverse rows of links set at right angles to the length of the sheet or strip of fabric.

Another object of the invention is to provide a carriage on which the link-forming tools are mounted and means to move said carriage relative to the supported web.

A further object of the invention is to provide an intermittently rotatable cam for moving said tool carriage and fabric relatively, and to also provide ratchet mechanism for imparting a step-by-step rotating motion to said cam.

A further object of the invention is to provide a roll for taking up the fabric as fast as each row is formed and to mount said roll in a frame which is adapted to be raised and remove the fabric from the tools to render the operating mechanism more accessible.

The invention further consists in the forming of the wire into a staple shape, to pass the legs of said staple through two adjacent links in the margin of the fabric, to then engage said ends by laterally movable members, and finally to close the same into ring form and cause the ends to abut.

The invention further consists in the provision of a hammer for striking the front forming tool against the bent ends of the link, for setting these ends firmly together and causing them to abut and remain in abutted position when released, for the purpose of facilitating the subsequent operation of automatic soldering.

A further object of the invention is to impart to the front forming tool a subsequent inward movement after the link has been formed, for the purpose of positioning said link so that it will hang properly in the mesh; this motion, however, is only necessary to be operated during the setting of every other row of links.

With these and other objects in view, the invention further consists of certain novel features of construction, as will be more fully described and particularly pointed out in the appended claims.

In the accompanying drawings:

Fig. 2 is a side elevation looking from the left of the machine, partly in section, to better show the link forming mechanism.

Fig. 3 is an elevation looking from the right end of the machine.

Fig. 4 is an enlarged view showing the pin roll operating mechanism.

Fig. 5 is a sectional side elevation showing the mechanism for controlling the throw of the cam which controls the link-tipping mechanism.

Figure 1:
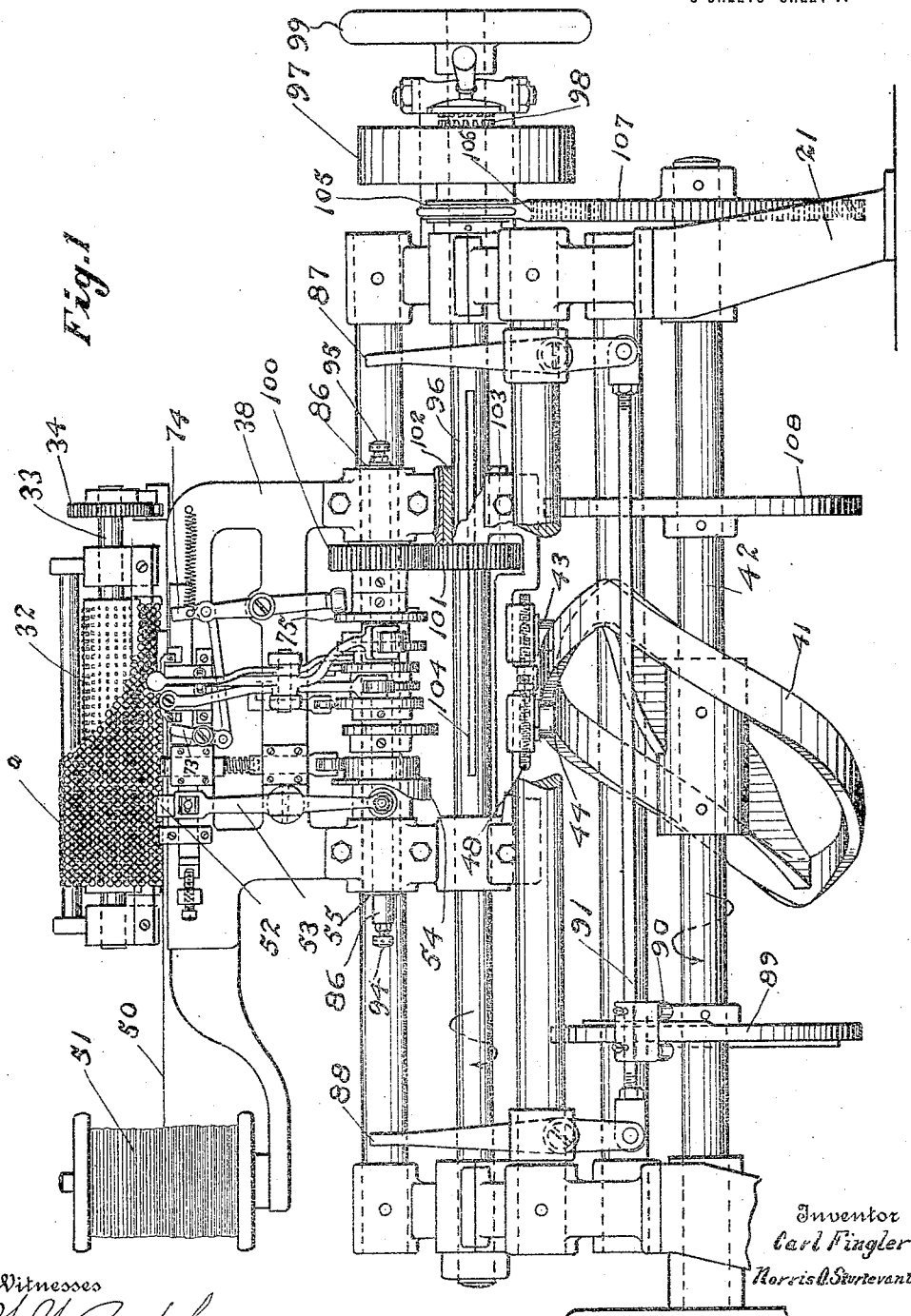
Figure 1 is a front elevation of the machine.

Fig. 5ª is an end view of this cam positioning mechanism.

Fig. 6 is a detail illustrating the mechanism for operating the link-setting hammer.

Fig. 7 is an enlarged detail illustrating the adjustable engaging members for contacting with the edges of the step-by-step carriage operating cam.

Fig. 7ª is a plan view showing the two contact members for engaging the opposite edges of the carriage driving cam.

Fig. 8 is an enlarged detail partly in section illustrating the forming pin and anvil withdrawing mechanism.

Fig. 9 is a diagrammatic view illustrating front and rear formers withdrawn, and the wire as having been fed in and in the act of being cut to length.

Fig. 10 shows the rear former as having been advanced and upon the wire to bend the same around the forming pin into a staple.

Fig. 11 illustrates the legs of the staple as having been passed through two adjacent links in the margin in the previously formed fabric, and the lateral benders as having been advanced to bend the ends of the staple.

Fig. 12 shows the front former as having been advanced to close the link ends about the anvil.

Fig. 13 is an enlarged side elevation illustrating the front former as advancing after having formed the link to push the same through the fabric and cause it to lie at the proper inclination to the face thereof.

Fig. 14 is an enlarged view illustrating the arrangement of the rings in the mesh in which the long and short rows alternate, the long rows having one more link than the short rows.

Referring to the drawings, the main frame 20 of the machine is supported on suitable legs or standards 21. This frame is built up and provided with suitable bearings to receive the three tie-rods 22, 23, and 24, which extend longitudinally across the machine and two of which serve as guides for the moving tool-supporting carriage hereinafter described.

At the rear of the frame is an upright supporting member 25 on the upper end of which are mounted brackets 26 in which the take-up roll-supporting side frames 27 are pivotally mounted at 28. These side frames are connected together by tie-rods 29 and 30, the rod 30 also serving to support and retain the forwardly and downwardly extending arms 31 in which is rotatably mounted the fabric take-up pin-roll 32, the fabric being herein designated by the dot and dash line at "a." On the outer end of the pin-roll shaft 33 we have mounted a ratchet wheel 34, which is engaged and rotated intermittently by the reciprocating spring-pressed pawl 35, see Fig. 4, which is pressed forward at the proper time to rotate the roll and take up the fabric after each row of links has been set in its margin, the pawl being returned by tension spring 35ª. By mounting this take-up roll on the pivoted frames 27 the roll support and its fabric may be raised out of the operating position by tipping the frame into the position illustrated in dotted lines in Fig. 2, thereby removing the fabric and roll from the tools to permit free access to the working parts.

In order to determine the exact height of the roll after being brought back into operative position we have provided a downwardly extending arm 36 on each of the frames 27 in which arms are positioned screws 37 by the adjustment of which, the mesh in the fabric may be accurately positioned vertically, relative to the forming tools.

A feature of this invention is that the link forming mechanism is mounted upon a carriage which moves relative to the fabric, which is supported in a relatively stationary position on its take-up roll. One advantage in moving the tools instead of the fabric is that where the fabric is moved, it has a tendency to swing from side to side when rapidly manipulated and so prevent perfect working of the link setting means, which difficulty is entirely overcome by our present construction.

The carriage on which the tools are mounted is supported by the two tie-rods 22 and 24 which are engaged by the guide arms 39 and 40 (see Fig. 2), and the carriage receives a step-by-step longitudinal motion by means of the very large rotatable cam 41 mounted on the shaft 42. The size and throw of this cam is such that one half revolution of the same imparts to the carriage the desired transverse motion to carry it across the entire width of the fabric and the other half revolution returns the carriage to the starting point. This cam engages the carriage directly and moves the same through engagement with the contacting members 43 and 44, each of which members, as best illustrated in Fig. 7, is provided with a body portion 45 and 46 at their upper edges to slide longitudinally on the bar 47 and which are adapted to be adjusted toward and from each other by the double-acting right-and-left screw 48, one end of which extends into the member 45 and the other into the member 46, the center portion of the screw being rotatably mounted in the downwardly extending lug portion 49 on the carriage. By this adjustment any desired degree of lost motion may be obtained at the beginning of each return stroke of the carriage for the purpose hereinafter described.

In forming the links the wire 50 is fed to the machine from the reel or spool 51 by any suitable wire feeding mechanism, such for instance as the biting jaw 52 reciprocated in the usual way by the lever 53 through edge cam 54 mounted on the hollow cam shaft 55, and the length of feed may be regulated in the usual way by any of the usual wire feeding constructions. This wire 50 as illustrated in Fig. 9, is fed back of the forming post 56. The forcing of this wire along back of this post causes its end to engage with the angular faced abutment 58, whereby the wire is sprung forward so that it is retained by the three-point bearing 56, 57 and 59 by the spring of the wire. The rear forming tool 60 is grooved at 61 to engage the wire, and bend it into U-shape about the post 56, about the same time the cutter 64 engages and severs the wire permitting its ends to be carried forward under action of the rear former and bent around the post 56. This forming post is now permitted to be withdrawn under action of its spring 67 by the positioning of its controlling cam 68. The withdrawing of this forming post now clears the way for the U-shaped staple to be carried by the rear forming tool, and its legs to be passed through the two adjacent rings 69 and 70. After these legs have extended through these rings in the margin of the fabric the laterally movable end engaging and bending fingers 71 and 72 are operated through the levers 73 and 74 and edge cam 75 (see Fig. 1) to close the ends of the loop about the center anvil 76. The cam 75 now permits these fingers to recede and the front forming tool 77 is advanced by the lever 78 and cam 79 which front former engages the partially shaped ring and draws the ends together causing them to firmly abut.

In some cases, particularly in fine mesh which is required to be soldered automatically, it is most essential that these ends are tightly abutted in order to permit the solder when heated to flow across permanently connecting the ends together; therefore, in order to insure the close abutting of these ends we have provided a hammer 80 which is mounted on the lever 81, see Fig. 6, which lever extends across and engages the cam 82 in such a way that the hammer is drawn back at the proper time and suddenly released by the notched portion 83 of this cam to permit the hammer head under action of the tension spring 84 to jump suddenly forward and strike a sharp blow against the outer end of the front forming tool holder.

It is found in practice necessary to provide means for tipping or positioning the links on every other row to cause them to lie at the proper inclination to the face of the fabric, therefore, to accomplish this link-tipping operation we have utilized the front forming tool 77, and in order to control its action we have provided an adjustable protuberance 85 on its operating cam 79. The positioning of this protuberance is controlled by the spindle 86 which extends through the hollow shaft 55 and which is moved endwise by contact with the levers 87 and 88 controlled in their action by the face cam 89 through contacts 90 (see Fig. 1) and connecting rod 91, whereby when the carriage 38 is moved to the extreme right the center spindle 86 is engaged by the lever 87 and moved to the left, thereby causing the finger 92 to ride out of the recess or cam portion 93 in the spindle 86 and push outward the protuberance into position to engage the lever 78 and advance the front former a distance necessary to tip the link on the proper side of the fabric. Adjusting screws 94 and 95 are inserted in the ends of the spindle 86 so as to overcome any inaccuracies or lost motion in its actuating mechanism. When the carriage reaches the opposite or left end of its travel the spindle is engaged by the lever 88, which moves it to the right and permits the protuberance under action of the spring 85ᵃ to recede into the recess 93 in said spindle, thereby removing this protuberance from engagement with the lever 78, in which case this front former moves forward only enough to close the link about the center anvil.

All of the operating mechanism is driven from the main shaft 96 through the pulley 97 which may be readily connected and disconnected to and from said shaft by means of the hand-operated clutch 98, the handwheel 99 being mounted on this shaft for the purpose of operating the mechanism by hand when desired. The cam shaft 55 on which the above-mentioned tool-operating cams are mounted is rotated through gears 100 and 101, the latter gear having a hub 102 mounted in a bearing 103 in the frame, and slides on a feather key in the keyway 104. The cam shaft 42 is driven from this main shaft 96 by means of an eccentric 105 (see Fig. 3) which reciprocates the pawl 106 to rotate this cam shaft 42 through the ratchet wheel 107.

In order to operate the take-up roll 32 at the end of each row of links, we have mounted the edge cam 108 on this shaft 42 on the face of which cam is formed a protuberance 109 to engage the lever 110 and cause the pawl bar 111 to advance sufficiently to raise the fabric the required distance to receive the next row of links.

The operation of our improved link-mesh machine may be more fully described as follows:

The motion is imparted to the moving parts from the pulley 97 to the main shaft 96, and the tool operating cam shaft 55 is run continuously at the required speed through the gears 100 and 101 to operate the link-forming mechanism.

One of the essential features of this invention is our improved means for imparting to this link-forming tool supporting carriage an intermittent motion directly through the action of the rotatable cam 41; and this cam is driven by a step-by-step ratchet mechanism and engages the carriage through downwardly projecting or contacting members 43 and 44, whereby each rotating movement of the cam by the step-by-step action of the ratchet, moves the carriage intermittently the required distance which is practically the diameter of the links being formed, the throw of the cam being sufficient so that one half revolution of the same moves the carriage the entire width of the fabric, and the other half of the revolution returns the carriage and forming tools to the starting point.

One of the essential features in the construction of a machine of this character is that the carriage is obliged to receive but a half step at the beginning of each return movement of the carriage. This half-step movement is very easily obtained by our improved mechanism by simply adjusting the contacting members 43 and 44 by turning the adjusting screw 48 so that a sufficient lost motion is left between these contacts to cause the carriage to move just one-half its normal step at the beginning of each return travel.

In order to move the carriage quickly back and forth across the face of the fabric without operating the whole mechanism, we have provided a handwheel 112 on the cam shaft 42, by the manipulation of which this cam shaft 42 may be rotated independent of the main shaft to move the carriage and its forming tools relatively to the fabric to set the same in any desired position to piece up if any imperfect links should be formed.

Another feature of our improved machine is our construction by which the take-up pin-roll may be lifted to move the fabric from the tools to permit free access to this more delicate link-setting mechanism.

We claim:

1. In a link-mesh machine, link forming tools, a support for a flat web of link-mesh fabric, a direct acting cam for effecting a relative movement of said fabric and tools, and ratchet mechanism for imparting a step-by-step rotating motion to said cam.

2. In a link-mesh machine, link forming tools, a carriage on which said tools are operatively mounted, a support for a flat web of link-mesh fabric, and means for moving said carriage step-by-step transversely of said web.

3. In a link-mesh machine, link forming tools, a carriage on which said tools are operatively mounted, a support for a flat web of link-mesh fabric, and a cam adapted to operate directly upon the carriage for moving the same step-by-step transversely of the web.

4. In a link-mesh machine, link forming tools, a carriage on which said tools are operatively mounted, a support for a flat web of link-mesh fabric, a carriage driving cam, and means for imparting to said cam intermittent rotating motion.

5. In a link-mesh machine, link forming tools, a carriage on which said tools are operatively mounted, a support for a flat web of link-mesh fabric, a cam adapted to operate directly upon said carriage, and a pawl and ratchet mechanism for imparting to said cam an intermittent motion.

6. In a link-mesh machine, link forming tools, a carriage on which said tools are operatively mounted, a support for a flat web of link-mesh fabric, means for moving said carriage step-by-step transversely of said web, and means for feeding the carriage one-half step at the beginning of each reverse travel.

7. In a link-mesh machine, link forming tools, a carriage on which said tools are operatively mounted, a support for a flat web of link-mesh fabric, a cam for moving said carriage step-by-step transversely of said web, and means on said cam for feeding the carriage but one-half step at the beginning of each reverse travel.

8. In a link-mesh machine, link forming tools, a carriage on which said tools are operatively mounted, a support for a web of link-mesh fabric, a cam directly connected to said carriage and means in said cam for feeding the carriage but one-half step at the beginning of each reverse travel, and a pawl and ratchet mechanism for imparting to said carriage an intermittent motion.

9. In a link-mesh machine, link forming tools, a carriage on which said tools are operatively mounted, a support for a flat web of link-mesh fabric, and means whereby said support and web may be readily moved bodily and guided both out of and into operating position, and means for moving said carriage step-by-step relative to said web.

10. In a link-mesh machine, link forming tools, a carriage on which said tools are operatively mounted, means for supporting a flat web of fabric in operative position whereby said fabric and its supporting means may be readily moved and guided both into and out of operating position, and means for moving the tool carriage relative to the fabric.

11. In a link-mesh machine, link forming tools, a carriage on which said tools are operatively mounted, a support for a flat web of link-mesh fabric, a pivoted frame in which said support is operatively mounted whereby the fabric and its support may be readily moved bodily into and out of operative position to render the tools more accessible, and means for moving the tool carriage step by step relative to the fabric.

12. In a link-mesh machine, link forming tools, a longitudinally movable carriage on which said tools are operatively mounted, a cam shaft also mounted in said carriage, cams on said shaft for operating said tools, a support for a flat web of link-mesh fabric, and means for moving said carriage step-by-step relative to said web.

13. In a link-mesh machine, link forming tools, a longitudinally movable carriage on which said tools are operatively mounted, a cam shaft also mounted in said carriage, cams on said shaft for operating said tools, a support for a flat web of link-mesh fabric, and an intermittently operated cam for moving said carriage relative to the web.

14. In a link-mesh machine, means for supporting a piece of link mesh, link forming tools, means for operating said tools to form links and connect them to the mesh, means for moving said mesh and tools relatively, and means whereby one of the said forming tools acts upon and causes its link after forming the same to assume the required angular relation to the face of the fabric.

15. In a link-mesh machine, means for supporting a piece of link mesh, link forming tools, means for operating said tools to form links and connect them to the mesh, means for moving said mesh and tools relatively, and means whereby one of said forming tools is given a continued inward stroke after the link has been formed, to position the link relative to the face of the fabric.

16. In a link-mesh machine, means for supporting a piece of link mesh, link forming tools, means for operating said tools to form links and connect them to the mesh, means for moving said mesh and tools relatively, an adjustable cam for operating upon one of said forming tools to push the link just formed back through the mesh to cause it to hang at the proper inclination relative to the face of the mesh, and a longitudinally slidable recessed spindle positioned by the action of the machine to move said cam into operative position.

17. In a machine of the character described, means for supporting a piece of link-mesh fabric, link forming tools, means for operating said tools to form links and connect them to the fabric, and a spring-actuated hammer for completing the closing of each link after being formed.

18. In a machine of the character described, means for supporting a piece of link-mesh fabric, link forming tools, means for operating said tools to form links and connect them to the fabric, and a cam-controlled spring-actuated hammer for completing the closing of each link after being formed.

19. In a machine of the character described, means for supporting a piece of link-mesh fabric, link forming tools, means for operating said tools to form and connect them to the fabric, a pivotally mounted spring-actuated hammer for striking the front forming tool against the link after having closed the link, and a cam for withdrawing said hammer after having struck the blow.

20. In a link-mesh machine, link forming tools, a support for a flat web of link-mesh fabric, an intermittently rotatable cam for moving said tools and fabric relatively, and means for striking a blow against the link just formed to close the same more tightly.

21. In a link-mesh machine, link forming tools, a carriage on which said tools are operatively mounted, a support for a flat web of link-mesh fabric, means for moving said carriage step-by-step transversely of said web, and means for striking a blow against the link just formed to close the same more tightly.

In testimony whereof we affix our signatures in presence of two witnesses.

CARL FINGLER.
NORRIS O. STURTEVANT.

Witnesses:
   JOHN E. PILLING,
   HOWARD E. BARLOW.

Copies of this patent may be obtained for five cents each, by addressing the "Commissioner of Patents, Washington, D. C."